United States Patent Office 2,907,097
Patented Oct. 6, 1959

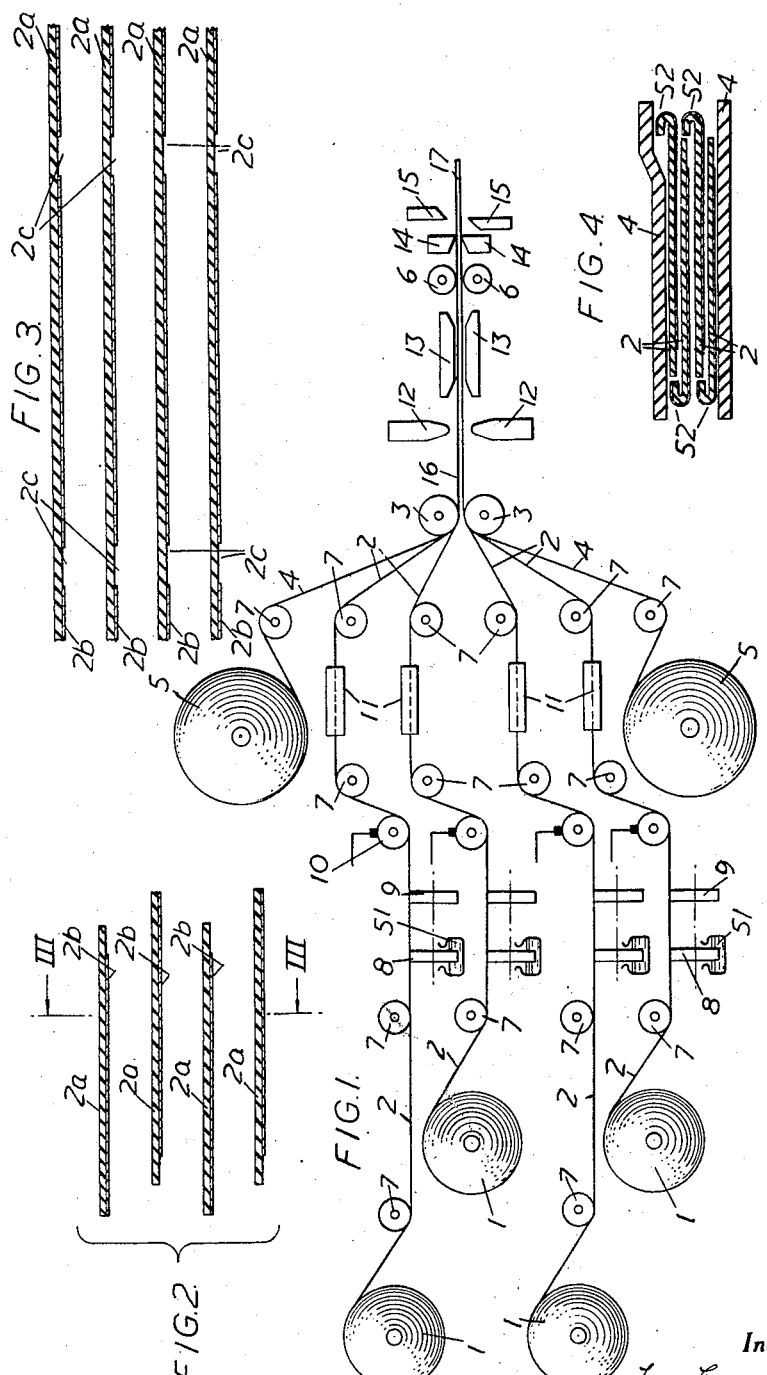

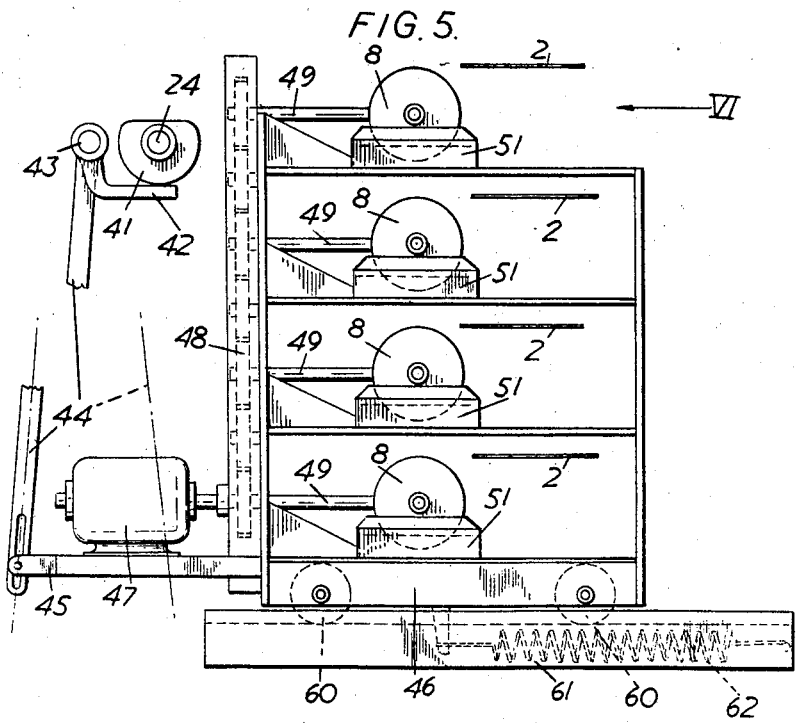
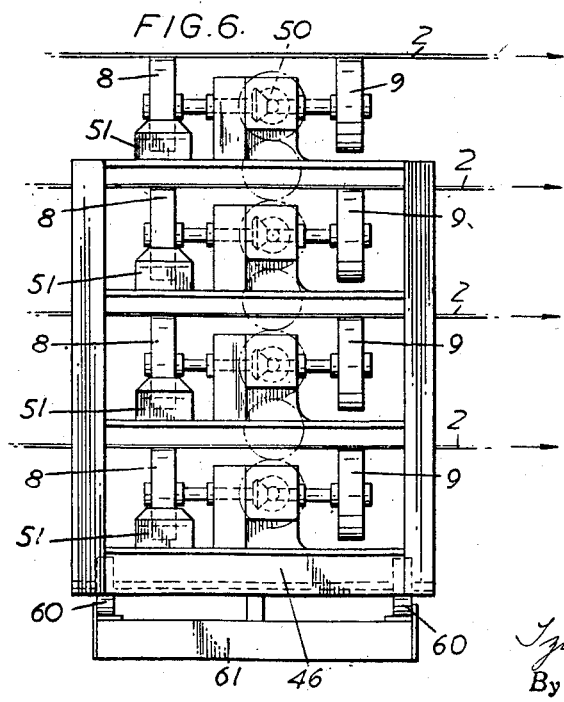

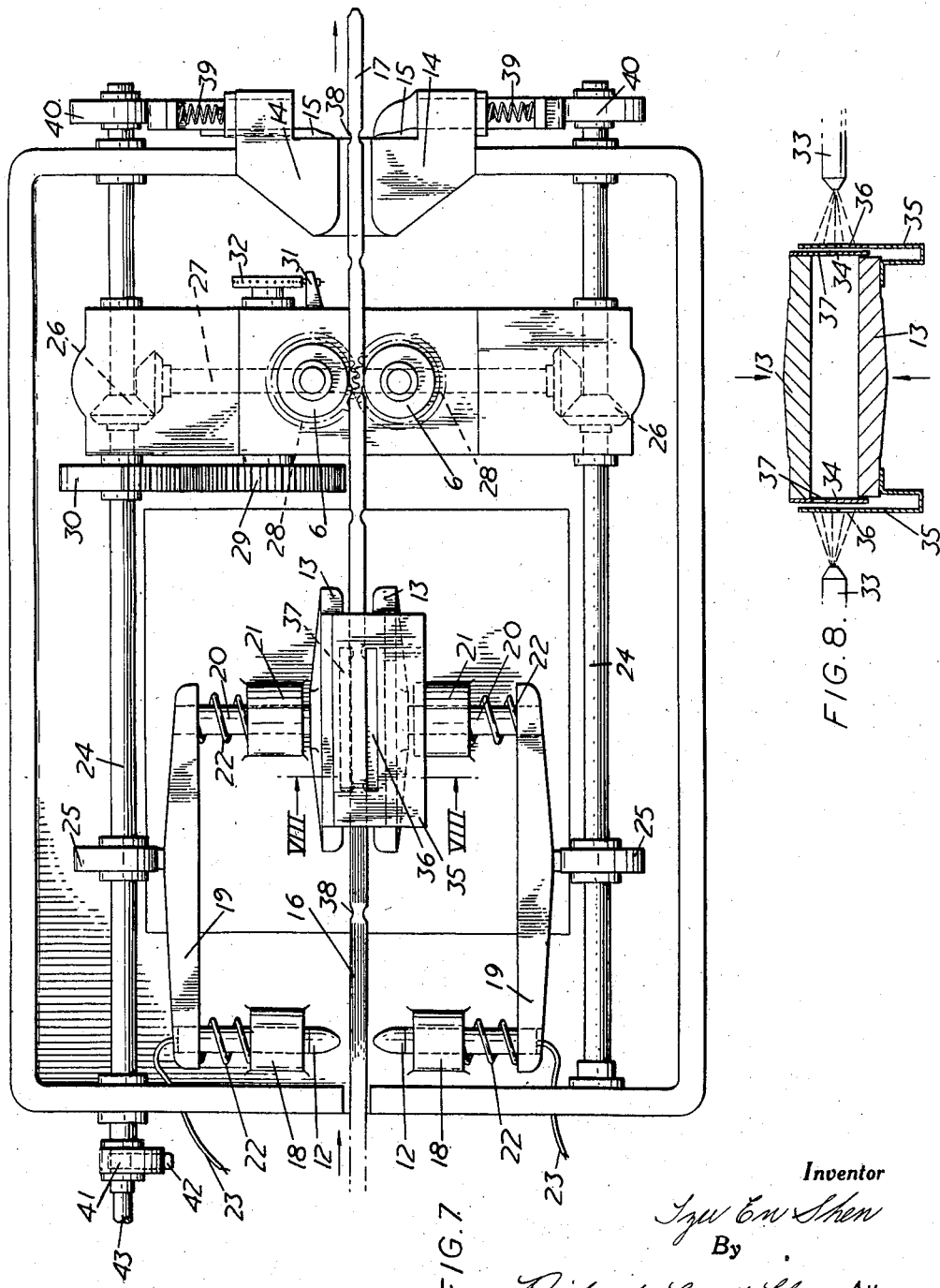

2,907,097

MANUFACTURE OF ELECTRIC CAPACITORS

Tzu En Shen, London, England, assignor to British Dielectric Research Limited, London, England, a British company Application August 23, 1954, Serial No. 451,512

Claims priority, application Great Britain August 24, 1953

4 Claims. (Cl. 29—25.42)

This invention is principally but not exclusively concerned with the manufacture in quantity of capacitors of relatively small size. In the method of manufacture according to the invention a number of metallised carrier strips of thin flexible dielectric material provided with transverse gaps in the metallisation, with or without plain dielectric strips interspersed, are passed together through a machine in superimposed and laterally staggered relation. The method of superimposition and the lateral staggering is similar to that adopted when feeding strips into a machine for producing capacitors of the wound type. In the present case however no winding takes place.

As the assemblage of strips proceeds through the machine the strips are sealed together by means of pressure and heat applied at the point where the transverse gaps in the metallisation occur and at a later stage the assembly is cut into short lengths by severing at the middle of each of the regions of sealing. In this way a large number of small capacitors of the stacked type is rapidly produced.

Either before or after the severing into units, each of the two sets of edges of the assemblage of strips is coated with metal, as by spraying, so as to unite the metallised surfaces which project at the respective sides and provide for the attachment of terminals or connecting wires thereto. The coating of metal is applied while the assemblage of layers is held under pressure so as to prevent penetration of the metal beyond the desired region.

The assemblage in a simple form may consist of two strips of plastic foil, for instance polystyrene, each metallised on one side and arranged so that one or both of the thicknesses of dielectric material is, or are, interposed between the layers of metallisation, with a thicker strip of unmetallised similar material on each side of these two foils. In most cases, however, more than two metallised foils will be used and, if necessary to secure the desired thickness of dielectric, additional unmetallised foils may be interposed. As already indicated the metallised layers will be staggered so that alternate layers project at opposite sides of the assemblage. It may be advantageous to turn over the edges of the metallised foils at the projecting sides so as to expose a larger area of metallised surface there to receive the metal applied by spraying and at the same time reduce the possibility of the spray penetrating beyond the desired region.

As will have been indicated by the description of the method of manufacture the strips are made of a thermoplastic adhesive material, or, alternatively, are coated with such a material so that under heat and pressure the layers in contact join together and form an enclosure for the edges of the adjacent metallised layers. As an example of the alternative arrangement the strips may be of paper coated with a polystyrene composition.

After the completion of the assembly as described and the application of terminal wires or strips each capacitor may be enclosed in a covering of protective material.

The transverse gaps in the metallisation may be provided at some preceding stage in the preparation of the strips, or may form the first step in the manufacturing process, a continuous covering of metal being broken up into separate lengths by the removal of metal to produce the transverse gaps. For the removal of the metallisation to form these gaps the method described in our application for Letters Patent Serial No. 360,582, now abandoned may be used. In another method the metallisation may consist of individual pieces of metal foil automatically cut from continuous strips of foil and applied at appropriate intervals to the surfaces of the strips of dielectric as these are assembled together. For applying the metallisation in this manner the method described in our co-pending application for United Kingdom Letters Patent No. 23,328/53 may be used.

The invention is further described with reference by way of example to the accompanying drawings wherein:

Figure 1 illustrates diagrammatically the various stages of the improved process;

Figure 2 is a transverse section through four strips of dielectric material before assembly;

Figure 3 is a section on the line III—III in Figure 2;

Figure 4 is a transverse section through the assembled strips;

Figure 5 is a view from the side of an arrangement for demetallising the strips before assembly;

Figure 6 is a view taken in the direction of the arrow VI in Figure 5;

Figure 7 is a view from the side of an arrangement for carrying out the sealing and cutting operations; and Figure 8 is a section through a part of the arrangement on the line VIII—VIII in Figure 7.

In the example hereinafter described the capacitors are made from four strips 2, each comprising a backing 2a of polystyrene coated on the underside with metal 2b, with a thicker unmetallised strip 4 of polystyrene on each side. The four metallised strips 2 are supplied from four rolls 1 mounted one above the other as shown in Figure 1 so that the strips are in laterally staggered relation as indicated in Figure 2. All the strips 2 and 4 are brought together at a pair of assembly rollers 3 through which they are drawn by a pair of driven rollers 6 in a step-by-step motion. Between the supply rolls 1 and 5 and the driven rollers 6 the strips pass certain stations which are spaced apart by appropriate distances and at each of these stations one of the manufacturing operations is performed.

Each of the metallised strips 2 is led under one or two freely rotatable guide rollers 7 to a demetallising device comprising a pair of wheels 8 and 9 disposed beneath the strip and mounted on a common spindle extending parallel with the path of the strip. The wheels are continuously rotated and arranged to make contact with the metallisation 2b, when the strip is stationary, at places spaced apart by the length of the capacitor to be made. The first roller 8 runs in a bath 51 of solvent which breaks down the bond between the metal and the dielectric strip and the second roller 9 wipes the metal from the dielectric. The wheels are maintained in a position out of engagement with the strip when this is moving. When the strip stops the wheels are moved across the strip so that each engages the metallisation across the full width and then moves into the non-contacting position. This operation produces a gap 2c (Figure 3) in the metallisation having a width determined by the width of the wheels.

All the de-metallising units are arranged to move together across the paths of the strips and are so positioned along the paths that when the strips are finally brought together at the assembly rollers 3 the gaps 2c on all the strips will coincide as illustrated in Figure 3.

After de-metallisation the strips 2 are each led under a roller electrode 10 connected to a source of high voltage. This serves to clear any electrically weak places in the metallised dielectric in the usual manner. Each strip 2 then passes over a guide roller 7 and through an edge-turning die 11 of any convenient form. These dies turn over the edges of the strips at the projecting sides so as to expose, as at the places 52 in Figure 4, a larger area of metallised surface to receive a sprayed metal coating. At the same time these turned-over edges serve to reduce the possibility of sprayed metal penetrating beyond the desired region, as will be clear from Figure 4 and the subsequent description.

The strips 2 now meet the outer non-metallised strips 4 at the assembly rolls 3 and the section of the assembly 16 at this point is diagrammatically represented in Figure 4.

At the next stage the strips are sealed together by sealing bars 12, each extending across the width of the assembly and arranged one below and one above the assembly. The sealing bars 12 are electrically heated and are brought together when the assembly is stationary to soften the dielectric and cause the layers to unite into a complete seal across the whole width. The position of the sealing bars is such that they engage the assembly where the metal has been removed. In the next stage the assembly is located between a pair of pressure plates 13 against the sides of which are directed two metal spraying nozzles not shown in Figure 1). The plates 13 come together at the same time as the sealing bars 12. The assembly is compressed between them and metal is sprayed onto both edges to unite the exposed metallisation without penetrating between the strips. Beyond the metal spraying position the assembly is engaged by the driven rollers 6 which provide the necessary step-by-step movement. From these rollers the assembly passes through supporting guides 14 beyond which are mounted reciprocating cutters 15. When the assembly is stationary the cutters are brought together to sever the projecting end portion 17 at the position of sealing to form a small capacitor unit. The capacity units thus produced are afterwards provided with terminals or connecting wires attached to the sprayed metal coverings on the two edges and subsequently with any required form of protective casing or covering.

The reciprocating parts 12, 13 and 15 are arranged to operate in synchronism with the step-by-step drive to the rollers 6. The sealing bars 12 and cutters 15 are spaced apart by a multiple of the distance between the de-metallising wheels 8 and 9 and the arrangement is adjustable so that the sealing and cutting always take place at the positions where the metal has been removed. One or both of the sealing bars 12 is preferably provided with a slightly convex surface for engaging the assembly. If the strips are moved continuously through the process stages, the several processing elements 8, 9, 12, 13 and 15 are arranged for reciprocation in the direction of that movement so that when they are in engagement there will be no relative movement between the strips and those elements.

The metal spraying may be carried out after the assembly has been cut into capacity units 17. For this purpose a number of the units may be piled together and held as a group between pressure plates so as to provide comparatively large surfaces to receive the metal spray. This has certain practical advantages and in particular it avoids the necessity for using very small spraying nozzles and/or shields.

In Figures 5 and 6 there is shown an arrangement for supporting the de-metallising wheels 8 and 9. The pairs of wheels are mounted one above the other in a carriage 46 adapted to traverse the path of the strips 2. It is supported on rollers 60 resting on a frame 61. The movement of the carriage in one direction is obtained by a tension spring 62 and in the other by a rocking shaft 43 to which is fixed an arm 42 engaging a cam 41 on a driving shaft 24. Fixed to the rocking shaft 43 there is a rocker arm 44 attached to the carriage by a sliding pivot 45. When the strips are stationary the movement of the cam 41 permits the spring 62 to draw the carriage from the position of rest shown in Figure 5 across the path of the strips 2 and then the cam 41 acts on the arm 44 to return the carriage to the position of rest. The carriage is always in the rest position shown, with the wheels out of engagement with the strips, when the strips are moving. The wheels 8 and 9 are continuously rotated by a small electric motor 47 through a chain of gears 48, shafts 49 and bevel gears 50. Each set of bevel gears 50 engages the common shaft of a pair of rollers 8 and 9. The roller 8 rotates in a bath of solvent 51.

In Figure 7 there is shown an arrangement for obtaining the step-by-step drive for the driving rollers 6 and for the reciprocating movement of the sealing bars 12, pressure plates 13 and cutters 15. On the upper side of the path of the assembly 16 a pressure bar 12 is mounted for sliding movement in a guide 18 and a pressure plate 13 is attached to a stem 20 mounted for sliding movement in a guide 21. The sealing bar 12 and the stem 20 are fixed to a common cross-bar 19. The cross-bar 19 is engaged by a cam 25 on a driving shaft 24. The cam 25 moves the sealing bar 12 and pressure plate 13 into engagement with the assembly against the action of compression springs 22 which return the device to the non-operative position when released by the cam 25. On the forward end of the driving shaft 24 is fixed another cam 40 which presses the cutter 15 into the path of the assembly against a compression spring 39. On the underside of the path of the assembly there is a similar arrangement, the two driving shafts 24 being connected by bevelled gears 26 and a cross-shaft 27. The driving rollers 6 are fixed to spindles on which are mounted toothed wheels 28 which are in permanent engagement. The upper toothed wheel 28 is driven through a gear wheel 29 in engagement with a half-gear wheel 30 fixed to one of the driving shafts 24. Thus the rollers 6 are driven during one half of each rotation of the driving shaft 24. A notched wheel 32 on the same shaft as the gear wheel 29 is engaged by a spring catch 31 to ensure that there is no movement of the driving rollers 6 when there is no drive from the half gear 30. For each rotation of the driving shaft 24 therefore there is a period during which the assembly 16 is stationary and during this stationary period the cams 25 and 40 produce the operative movement of the sealing bars 12, pressure plates 13 and cutters 15. The previously mentioned cam 41 also produces the required traversing movement of the de-metallising wheels previously described with reference to Figures 5 and 6. Both sealing bars are electrically heated through flexible leads 23. It will be seen from Figure 7 that the cutters 15 sever the assembly 16 substantially in the centre of the non-metallised sealed portion 38.

On the sides of the upper pressure plate 13 are mounted shields 34 and on the lower pressure plate there are arranged similar shields 35. Each of the shields 34 is provided with a longitudinal slot 37 and similarly the shields 35 are provided each with a longitudinal slot 36. It will be seen from Figure 8 that in the non-operative position the space between the pressure plates 13 is screened by the overlapping shields against the entry of metal from the spray guns 33. The size and position of the slots 36 and 37 is so chosen that when the plates 13 are brought together the sides of the portion of the assembly 16 between them will receive sprayed metal through the aligned slots 36 and 37.

What I claim as my invention is:

1. A method of manufacture of stack type capacitors from a number of metallized strips of flexible dielectric material, each having transverse gaps in the metallization and extending across the width of the strip, comprising assembling the strips in superimposed and laterally staggered relation with the non-metallized places in adjacent strips coinciding, advancing the assembly along a linear path extending through a sealing stage followed by a severing stage, applying heat and pressure, in the sealing stage, locally to the assembly at positions of coincidence of non-metallized places on the strips to seal the strips together at those positions and, in the severing stage, cutting through the assembly at each such position to remove a short length from the leading end of the assembly.

2. A method of manufacture of stack type capacitors from a number of metallized strips of flexible dielectric material, comprising advancing the strips in laterally staggered relation to an assembly position, removing metal from each strip in its passage to the assembly position to form transverse gaps in the metallization extending across the width of and at equidistant intervals along the strip, superimposing the strips at the assembly position with the non-metallized places coinciding in adjacent strips, advancing the assembly along a linear path extending through a sealing stage followed by a severing stage, applying heat and pressure, in the sealing stage, locally to the assembly at positions of coincidence of non-metallized places on the strips to seal the strips together at those positions, and, in the severing stage, cutting through the assembly at each such position to remove a short length from the leading end of the assembly.

3. A method of manufacture of stack type capacitors from a number of metallized strips of flexible dielectric material, comprising advancing the strips in laterally staggered relation to an assembly position, removing metal from each strip in its passage to the assembly position to form transverse gaps in the metallization extending across the width of and at equidistant intervals along the strip, superimposing the strips at the assembly position with the non-metallized places coinciding in adjacent strips, advancing the assembly along a linear path through a sealing stage followed by a metal spraying stage and a severing stage, the sealing and severing stages being spaced apart by a multiple of the distance between adjacent non-metallized places on a strip, applying heat and pressure in the sealing stage locally to the assembly at positions of coincidences of non-metallized places on the strips to seal the strips together at those positions, pressing the strips together at the metal spraying stage and there spraying metal to each edge of the assembly, and, in the severing stage, cutting through the assembly at each said position to remove a short length from the leading end of the assembly.

4. A method of manufacture as claimed in claim 3, in which, during its passage to the assembly position, the edges of the strips are individually turned over to increase the area of metallization exposed at the edges.

References Cited in the file of this patent

UNITED STATES PATENTS

| | | |
|---|---|---|
| 1,841,628 | Pickard | Jan. 19, 1932 |
| 1,926,842 | Dubilier | Sept. 12, 1933 |
| 2,731,705 | Grouse | Jan. 24, 1956 |

FOREIGN PATENTS

| | | |
|---|---|---|
| 437,429 | Great Britain | Oct. 29, 1935 |
| 684,529 | Great Britain | Dec. 17, 1952 |